United States Patent
Cui et al.

(10) Patent No.: US 11,307,423 B2
(45) Date of Patent: Apr. 19, 2022

(54) IMAGE PROCESSING METHOD FOR AUGMENTED REALITY DEVICE, AUGMENTED REALITY DEVICE AND STORAGE MEDIUM

(71) Applicants: BEIJING BOE OPTOELECTRONICS TECHNOLOGY CO., LTD., Beijing (CN); BOE Technology Group Co., Ltd., Beijing (CN)

(72) Inventors: Liyang Cui, Beijing (CN); Jiankang Sun, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 15 days.

(21) Appl. No.: 16/903,400

(22) Filed: Jun. 17, 2020

(65) Prior Publication Data
US 2020/0409161 A1    Dec. 31, 2020

(30) Foreign Application Priority Data
Jun. 28, 2019   (CN) .......................... 201910577995.0

(51) Int. Cl.
*G02B 27/01*    (2006.01)
*G06F 3/01*     (2006.01)

(52) U.S. Cl.
CPC ........ *G02B 27/0176* (2013.01); *G06F 3/013* (2013.01); *G02B 2027/0134* (2013.01); *G02B 2027/0178* (2013.01)

(58) Field of Classification Search
CPC ........... G06F 3/01; G06F 3/013; H04N 5/232; H04N 5/232127; G02B 27/01; G02B 2027/0187
See application file for complete search history.

(56) References Cited

U.S. PATENT DOCUMENTS

| | | | | |
|---|---|---|---|---|
| 4,198,114 A * | 4/1980 | Zapp | ................. | G02B 27/0172 359/376 |
| 10,345,607 B2 * | 7/2019 | Wang | ................. | G02B 27/4205 |
| 10,607,347 B1 * | 3/2020 | Poliakov | ................. | G06T 7/11 |
| 2012/0127062 A1 * | 5/2012 | Bar-Zeev | ............. | G06T 19/006 345/6 |

(Continued)

*Primary Examiner* — William Lu
(74) *Attorney, Agent, or Firm* — Ling Wu; Stephen Yang; Ling and Yang Intellectual Property (57) ABSTRACT

An image processing method for an augmented reality device, an augmented reality device and a storage medium are provided. The image processing method for the augmented reality device includes: tracking lines of sight of a left eye and a right eye to determine a position of a binocular watching range in a three-dimensional space; shooting an image of an external environment where the augmented reality (AR) device is located, and acquiring environment map point cloud data based on a Simultaneous Localization and Mapping (SLAM) algorithm; and updating the environment map point cloud data within the binocular watching range in response to detecting an update of the image of the external environment.

18 Claims, 4 Drawing Sheets

(56) References Cited

U.S. PATENT DOCUMENTS

| | | | |
|---|---|---|---|
| 2013/0050070 A1* | 2/2013 | Lewis | G06K 9/00604 |
| | | | 345/156 |
| 2013/0083003 A1* | 4/2013 | Perez | A63F 13/79 |
| | | | 345/419 |
| 2015/0314443 A1* | 11/2015 | Yu | B25J 9/1666 |
| | | | 701/28 |
| 2017/0192232 A1* | 7/2017 | Katz | G06T 19/006 |
| 2017/0193687 A1* | 7/2017 | Lo | G06T 5/006 |
| 2017/0206691 A1* | 7/2017 | Harrises | G02B 27/0172 |
| 2018/0088340 A1* | 3/2018 | Amayeh | G06K 9/00275 |
| 2018/0341022 A1* | 11/2018 | Guo | G06F 17/11 |
| 2019/0134487 A1* | 5/2019 | Kudirka | G06F 3/011 |
| 2019/0294239 A1* | 9/2019 | Suzuki | G02B 27/017 |
| 2019/0371028 A1* | 12/2019 | Harrises | G06K 9/00671 |
| 2020/0275071 A1* | 8/2020 | Zavoyskikh | G02B 27/0179 |

\* cited by examiner

FIG. 8

IMAGE PROCESSING METHOD FOR AUGMENTED REALITY DEVICE, AUGMENTED REALITY DEVICE AND STORAGE MEDIUM

CROSS-REFERENCE TO RELATED APPLICATION

The present application claims the priority of Chinese Patent Application No. 201910577995.0 filed to the CNIPA on Jun. 28, 2019, the entire content of which is hereby incorporated by reference.

TECHNICAL FIELD

The present disclosure relates to, but is not limited to, the technical field of augmented reality, and in particular to an image processing method for an augmented reality device and the augmented reality device.

BACKGROUND

An Augmented Reality (AR) technology may superimpose a virtual world on a real world on a display screen and perform interaction. Based on the interactive effect and entertaining characteristics of the AR device, it has gradually been applied to people's life and entertainment.

The AR device focuses on the merging of virtual and reality to realize real-time interaction between a user and an environment. When a virtual object needs to be added at a certain position in space, an already constructed spatial map needs to be called to determine a position of the virtual object in space. Therefore, the AR device relies on spatial localization and environment mapping technology. Its core requirement is miniaturization and lightweight of the localization and mapping algorithm. Existing AR devices generally use a Simultaneous Localization and Mapping (SLAM) algorithm for spatial localization and environment mapping, but the SLAM algorithm may form false afterimage when constructing an environment map in a scene with a moving object.

It is very computationally intensive and time consuming for some improved solutions aiming at the afterimage problem of the SLAM algorithm, which increases a computational burden of the AR device.

SUMMARY

The following is a summary of the subject matter described in detail herein. This summary is not intended to limit the protection scope of the claims.

An embodiment of the present disclosure provides an image processing method for an augmented reality (AR) device, including: tracking lines of sight of a left eye and a right eye to determine a position of a binocular watching range in a three-dimensional space; shooting an image of an external environment where the AR device is located, and acquiring environment map point cloud data based on a Simultaneous Localization and Mapping (SLAM) algorithm; and updating the environment map point cloud data within the binocular watching range in response to detecting an update of the image the external environment.

In an exemplary embodiment, the tracking the lines of sight of the left eye and the right eye to determine the position of the binocular watching range in the three-dimensional space includes: capturing an image of a left eye and an image of a right eye, determining a center position of a left pupil according to the image of the left eye, and determining a center position of a right pupil according to the image of the right eye; inputting pupil center position data of both eyes into a sight watching model to determine a position of an intersection point of the lines of sight of both eyes on a virtual imaging plane; and determining a midpoint of a line connecting a left exit pupil center and a right exit pupil center of a binocular optical imaging module of the AR device, constructing a sight cone by taking the line connecting the midpoint and the intersection point as a central axis, and taking a space within the sight cone as the binocular watching range; wherein a vertex of the sight cone is the midpoint.

In an exemplary embodiment, the sight watching model is used to describe a mapping relationship between coordinates of the centers of the pupils of both eyes in a coordinate system and coordinates of watching points of the lines of sight of both eyes on left and right imaging planes of the binocular optical imaging module of the AR device in the coordinate system.

In an exemplary embodiment, the inputting the pupil center position data of both eyes into the sight watching model to determine the position of the intersection point of the lines of sight of both eyes on the virtual imaging plane includes: inputting the pupil center position data of both eyes into the sight watching model, and calculating a coordinate of a left watching point on a left imaging plane and a coordinate of a right watching point on a right imaging plane of the binocular optical imaging module of the AR device; and determining a coordinate of the intersection point of a left watching line and a right watching line on the virtual imaging plane; wherein the left watching line is determined by the left exit pupil center point and the left watching point on the left imaging plane, and the right watching line is determined by the right exit pupil center point and the right watching point on the right imaging plane.

In an exemplary embodiment, the sight watching model includes a polynomial model, and the polynomial model is expressed by a following formula:

$$\begin{cases} g_x = a_0 + a_1 x + a_2 y + a_3 xy + a_4 x^2 + a_5 y^2 \\ g_y = b_0 + b_1 x + b_2 y + b_3 xy + b_4 x^2 + b_5 y^2 \end{cases}$$

wherein $(g_x, g_y)$ is the coordinate of a watching point on an imaging plane of the binocular optical imaging module of the AR device, $(x,y)$ is the coordinate of an eye pupil center, and $a_0, a_1, a_2, a_3, a_4, a_5, b_0, b_1, b_2, b_3, b_4, b_5$ are parameters of the model.

In an exemplary embodiment, before tracking the lines of sight of the left and right eyes, the method further includes: selecting X watching points on virtual imaging planes of the binocular optical imaging module of the AR device, wherein a distance between a virtual imaging plane where an i-th watching point is located and an origin of coordinates in the coordinate system is Di, wherein i is a positive integer greater than or equal to 1 and less than or equal to X; determining X groups of imaging coordinates of the X watching points on the left and right imaging planes of the binocular optical imaging module according to the coordinates of the X watching points and the left and right exit pupil center points of the X watching points on the binocular optical imaging module; capturing human eye images when human eyes watch the X watching points, and acquiring X groups of coordinates of left and right pupil center points when human eyes watch the X watching points; and inputting the X groups of imaging coordinates and the X groups of coordinates of left and right pupil center points into the sight watching model to acquire parameter values of the sight watching model.

In an exemplary embodiment, an initial value of an apex angle φ of the sight cone is greater than or equal to 15 degrees and less than or equal to 30 degrees.

In an exemplary embodiment, the detecting an update of the image of the external environment includes: capturing the image of the external environment through a binocular camera in real time, performing spatial localization and environment mapping based on the SLAM algorithm; and when a front-end localization thread of the SLAM algorithm outputs a new key frame for environment mapping to a back-end mapping thread, converting the new key frame into a three-dimensional point cloud, taking the three-dimensional point cloud as an input point cloud to match the binocular watching range, and taking the input point cloud located within the binocular watching range as an update point cloud.

In an exemplary embodiment, the updating the environment map point cloud data within the binocular watching range includes: calculating an average distance $d_2$ between the midpoint of the line connecting the center points of the left and right exit pupils and each point in the update point cloud; calculating an average distance $d_3$ between the midpoint of the line connecting the center points of the left and right exit pupils and each point in a target point cloud; wherein, the target point cloud is an initial point cloud falling within the binocular watching range, and the initial point cloud is a three-dimensional point cloud generated according to an old image of the environment map; and comparing the sizes of $d_2$ and $d_3$, and when the sizes of $d_2$ and $d_3$ satisfy a condition for updating the environment map, replacing the target point cloud with the update point cloud.

In an exemplary embodiment, the condition for updating the environment map includes: $d_3 < d_2 \cdot s$, wherein s is a coefficient less than 1.

In an exemplary embodiment, after replacing the target point cloud with the update point cloud, the method further includes: updating the sight cone; and recalculating the average distance $d_2$ between the midpoint of the line connecting the center points of the left and right exit pupils and the update point cloud and the average distance $d_3$ between the midpoint of the line connecting the center points of the left and right exit pupils and the target point cloud; comparing the sizes of $d_2$ and $d_3$, and when the sizes of $d_2$ and $d_3$ satisfy the condition for updating the environment map, replacing the target point cloud with the update point cloud.

In an exemplary embodiment, the updating the sight cone includes: setting the angle φ to be n times of the initial value, wherein n is greater than 1 and less than or equal to 4.

An embodiment of the present disclosure also provides an augmented reality device, including: an environment image capturing camera module, configured to capture an environment image; a human eye image capturing camera module, configured to capture a human eye image; a memory configured to store executable instructions; and a processor, configured to implement the steps of the image processing method for the augmented reality device described in any one of above embodiments.

An embodiment of the present disclosure also provides a computer readable storage medium that stores executable instructions. When the executable instructions are executed by a processor, the steps of the image processing method for the augmented reality device described in any one of above embodiments are implemented.

Other aspects will become apparent upon reading and understanding the drawings and detailed description.

BRIEF DESCRIPTION OF DRAWINGS

Accompanying drawings are used to provide a further understanding of technical solutions of the present application, form a part of the specification, and are used to explain technical solutions of the present application together with embodiments of the present application, but do not constitute a limitation on the technical solutions of the present application.

DETAILED DESCRIPTION

In order to make purposes, technical solutions and advantages of the present disclosure clearer, embodiments of the present disclosure will be described in detail below with reference to the accompanying drawings. Without conflict, embodiments in the present disclosure and features in the embodiments may be combined with each other arbitrarily.

The steps shown in a flowchart of the drawings may be performed in a computer system such as a set of computer executable instructions. Moreover, although a logical sequence is shown in the flowchart, in some cases, the steps shown or described may be performed in a sequence different from that shown.

Application of the AR device relies on spatial localization and environment mapping technology (such as the SLAM algorithm), and a core requirement of a localization and mapping algorithm are miniaturization and lightweight. The SLAM algorithm is one of the most important algorithms for localization and mapping of existing AR devices. The basic framework of the SLAM algorithm adopts three threads of front-end, back-end and loop detection. The front-end captures images through a camera, realizes localization according to a machine vision, and extracts a key image frame and sends it to the back-end. The back-end constructs an environment map according to the key image frame extracted by the front-end and the feature points contained therein, and performs overall optimization in combination with the loop detection thread.

The environment map is of great significance for an AR device to interact with the environment. It is needed to determine the content to be rendered in a point cloud space of the environment map. For example, to superimpose a virtual object, it is needed to use the location information in the point cloud space and select an anchor point set from it. The SLAM algorithm is generally based on static space for the construction of an environment map. For a space where a dynamic object exists, the object is located at a particular position at a particular moment and moves to another position after a period of time (for example, tens of seconds). The SLAM algorithm will save the key image frames and feature points of the object in the two different positions in the environment map. In fact, only the latest image is real, and the previous image forms a false image sticking (afterimage).

For the above afterimage problem of the SLAM algorithm in a dynamic space, in some improved methods, which feature points have been changed is detected in the back-end mapping thread, and then those feature points are removed, and a key image frame is updated when most feature points in the key image frame are removed. As these improved methods need to detect which feature points have been changed in real time, they need to calculate feature matching, and also need to search and delete the environment map. This requires a lot of computations and is time consuming, which increases the computational burden of the AR device. Under the limited computing resources of the AR device, it is needed to reduce the computation amount required for the afterimage problem of the SLAM algorithm.

The present disclosure provides several specific embodiments as follows, which can be combined with each other, and the same or similar concepts or processes may not be repeated in some embodiments.

Figure 1:
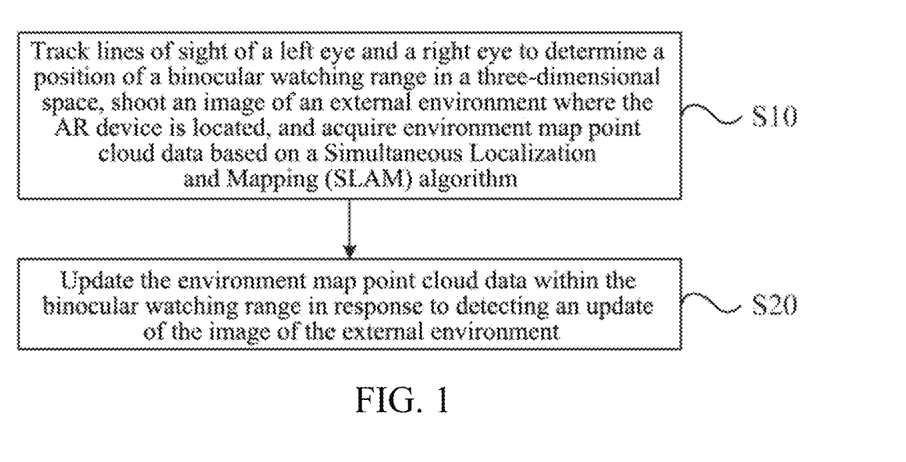
FIG. 1 is a flowchart of an image processing method for an AR device according to the present disclosure.

FIG. 1 is a flowchart of an image processing method for an augmented reality (AR) device provided by an embodiment of the present disclosure. As shown in FIG. 1, the image processing method for the AR device provided by an embodiment of the present disclosure may include the following steps S10-S20.

In S10, lines of sight of a left eye and a right eye are tracked to determine a position of a binocular watching range in a three-dimensional space; an image of an external environment where the AR device is located is shot, and environment map point cloud data are acquired based on a Simultaneous Localization and Mapping (SLAM) algorithm.

In S20, when update of the image of the external environment is detected, environment map point cloud data within the binocular watching range are updated.

In the embodiment, an eyeball tracking algorithm has a lighter calculation than the traditional SLAM environment map updating algorithm. By calculating the watching range through the eyeball tracking algorithm, a position in the point cloud space of the environment map can be determined more quickly, and the point cloud data in the watching range can be effectively updated, thus eliminating an effect of an afterimage of an object on the environment map without carrying out complicated calculation processing. This method has a small computation amount and is easy to implement on an AR device.

In the image processing method for an AR device provided by the embodiment of the present disclosure, the AR device is an AR device which adopts a typical binocular optical structure and forms a stereoscopic image based on left and right eye parallax. A binocular optical imaging module of the AR device may be equivalently regarded as a transparent imaging plane, and the position of the plane in a coordinate system depends on the structure of the AR device only. In an exemplary embodiment, the light center of the left camera of a binocular camera on an outer side of the AR device may be taken as an origin, and a right-hand coordinate system O-x-y-z may be established according to the origin, with the Z axis pointing to the front of the camera. One of ordinary skill in the art should understand that this manner of establishing the coordinate system is merely an example for illustration. Other manners for establishing the coordinate system may be applied as along as coordinates of various positions of the AR device can be determined.

The binocular optical imaging module of the AR device may include a micro display screen and an optical element. The micro display screen is used to provide display content for the AR device. The micro display screen may be a self-luminous active device, or may be a liquid crystal display screen needing external light source illumination, or may be a Digital Micromirror Device (DMD) based on a Micro-Electro-Mechanical System (MEMS) technology, or may be a Laser Beam Scanner (LBS) based on the MEMS technology. The optical element may be a prism or a freeform surface or a BirdBath or an optical waveguide, etc. Self-luminous active devices include: Micro-Organic Light-Emitting Diode (Micro-OLED) or micro-Light Emitting Diode (micro-LED). According to a parallax principle, when the left and right eyes of a user wearing the AR device respectively watch images on the left and right imaging planes of the binocular optical imaging module, because the lines of sight intersect, it can be equivalent to projecting a virtual object to a virtual imaging plane far away from the eyes to form a stereoscopic effect, and the distance of the image on the virtual imaging plane from the eyes is adjusted by controlling the parallax on the left and right imaging planes.

The AR device in an embodiment of the present disclosure further includes a binocular camera. The binocular camera is disposed on an outer side of the AR device and is in a same direction as a watching direction of human eyes, and is used for shooting the external environment, and performs spatial localization and environment map construction through the SLAM algorithm. The environment map is of a great significance for the AR device to interact with the environment. The AR device may determine the content to be rendered in the point cloud space of the environment map, for example, to superimpose a virtual object, it is needed to use the location information in the point cloud space, and select an anchor point set from it. The SLAM algorithm is generally based on a static space for the construction of an environment map. When a dynamic object exists, the afterimage of the object that has moved dynamically will still occupy the point cloud space of the environment map.

The AR device provided by an embodiment of the disclosure may not only perform spatial localization and environment map construction through the SLAM algorithm, but may also be provided with cameras inside the AR device for shooting human eyes, such as two infrared cameras which may be installed on an inner side of the eye part of the AR device to capture eye images of a user wearing the AR device, and determine the watching range through the captured eye images. In an embodiment of the present disclosure, capturing human eye images and determining the watching range may be performed by an eyeball tracking technology. The eyeball tracking technology generally uses an infrared camera to acquire image information of a human eye, then extracts a Region of Interest (ROI) of the human eye pupil through feature detection in a shot human eye image, extracts the pupil therefrom according to a pupil localization algorithm, and determines the pupil center through an ellipse fitting.

The selection of the binocular camera in an embodiment of the present disclosure ensures that the watching range of human eyes can always be covered by the external environment images captured by the binocular camera.

In an embodiment of the present disclosure, the watching range obtained by capturing human eye images is taken as a target range for subsequent removal of an afterimage. Since the region watched by the pupils of human eyes is the region to which the human eyes pay most attention, the watching range obtained based on the eyeball tracking technology is also the region to which the human eyes pay most attention in the environment map of the AR device. Therefore, the region to which the human eyes pay most attention in the environment map of the AR device (i.e. the watching range) is taken as the target range for removing the afterimage.

Compared with the solutions for removing the afterimage in some AR devices in the related art, in which an overall image of the external environment (i.e. the entire environment map point cloud space) as a target range for removing the afterimage, in the embodiment of the present disclosure, the eyeball tracking technology is adopted to determine the watching range of human eyes, and the environment map point cloud space in the watching range is optimized and updated, so that the calculation amount required for optimizing the environment map may be greatly reduced, and the real-time updating and usability of the environment map may be maintained, and it has the characteristics of small calculation amount, high calculation speed and the like. For AR devices with miniaturization and lightweight calculation requirements, the image processing method for the AR device provided by the embodiment of the disclosure is convenient to implement.

In the image processing method for the AR device provided by an embodiment of the present disclosure, algorithms mainly include an eyeball tracking algorithm and a SLAM algorithm, wherein the SLAM algorithm is further divided into three threads of front-end localization, back-end mapping and loopback detection. An order of the operation speeds of the algorithms and the algorithm threads from fast to slow is: eyeball tracking algorithm>SLAM front-end localization>SLAM back-end mapping>SLAM loopback detection, wherein the operation speed of the eyeball tracking algorithm is the fastest. As the framework of the SLAM algorithm is very complex and huge, only the back-end mapping thread of the SLAM algorithm is mainly introduced and described in embodiments of the present disclosure.

Figure 2:
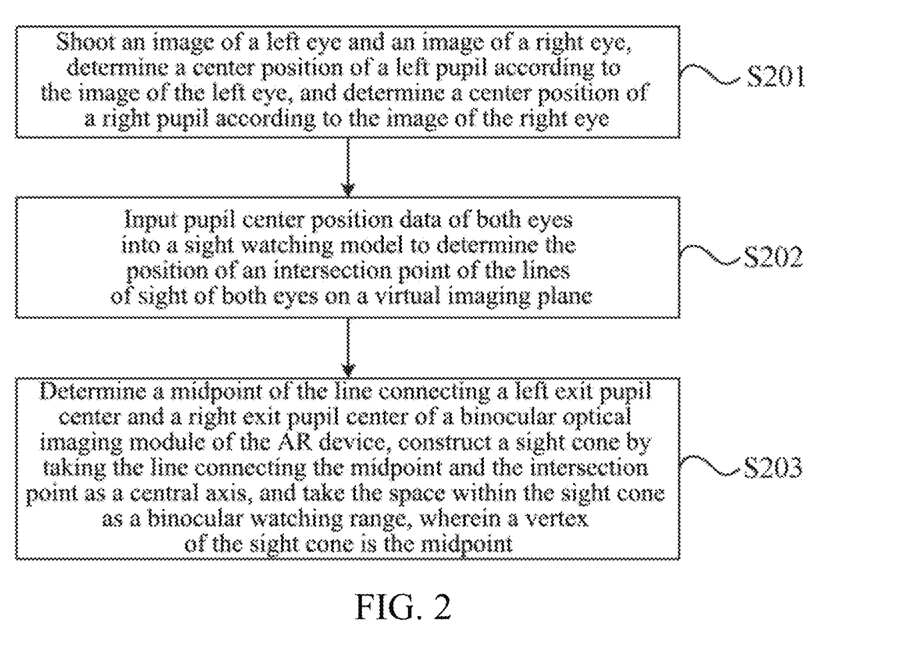
FIG. 2 is a flowchart of an implementation for determining a watching range according to the present disclosure.

In an exemplary embodiment, as shown in FIG. 2, an embodiment for determining a watching range may include the following steps S201-S203.

In S201, an image of a left eye and an image of a right eye are shot, a center position of a left pupil is determined according to the image of the left eye, and a center position of a right pupil is determined according to the image of the right eye.

In S202, pupil center position data of both eyes are input into a sight watching model to determine the position of an intersection point of the lines of sight of both eyes on a virtual imaging plane.

In S203, a midpoint of the line connecting a left exit pupil center and a right exit pupil center of a binocular optical imaging module of the AR device is determined, a sight cone is established by taking the line connecting the midpoint and the intersection point as a central axis, and the space in the sight cone is taken as a binocular watching range; wherein a vertex of the sight cone is the midpoint.

In an exemplary embodiment, the sight watching model is used to describe a mapping relationship between the coordinates of the pupil centers of both eyes and the imaging coordinates of watching points of the lines of sight of both eyes on the left and right imaging planes of the binocular optical imaging module of the AR device.

In an exemplary embodiment, the sight watching model includes a polynomial model, and the polynomial model is expressed by the following formula:

$$\begin{cases} g_x = a_0 + a_1 x + a_2 y + a_3 xy + a_4 x^2 + a_5 y^2 \\ g_y = b_0 + b_1 x + b_2 y + b_3 xy + b_4 x^2 + b_5 y^2 \end{cases} \quad (1)$$

Herein, $(g_x, g_y)$ is a coordinate of a watching point on a imaging plane of the binocular optical imaging module of the AR device, and $(x,y)$ is a coordinate of an eye pupil center, and $a_0, a_1, a_2, a_3, a_4, a_5, b_0, b_1, b_2, b_3, b_4, b_5$ are model parameters.

Figure 3:
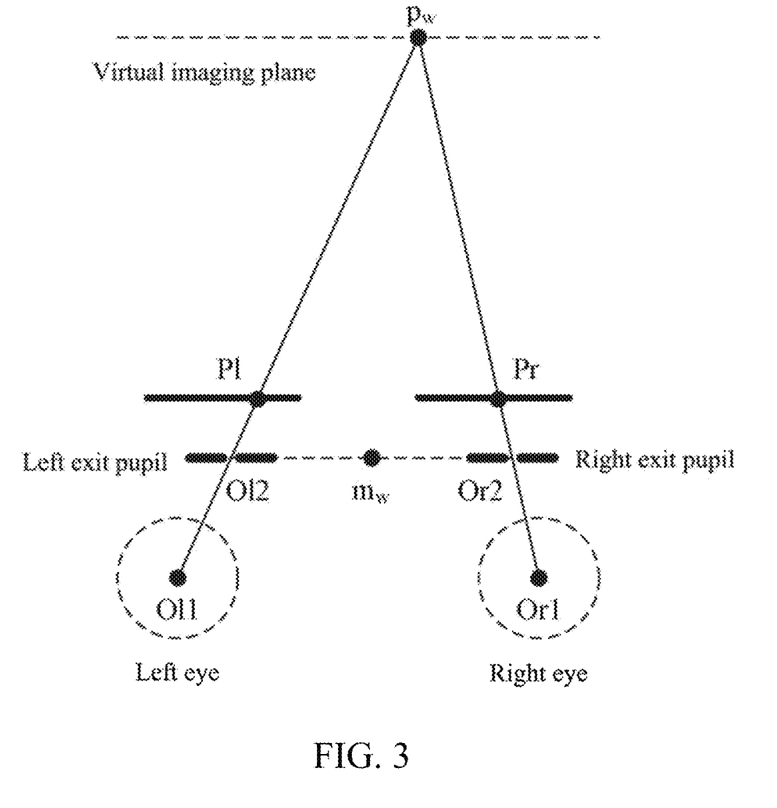
FIG. 3 is a schematic diagram of an imaging principle of a sight watching model according to the present disclosure.

FIG. 3 is a schematic diagram of an imaging principle of a sight watching model provided by an embodiment of the present disclosure. FIG. 3 schematically shows a left eye and a right eye, a left pupil center point Ol1 and a right pupil center point Or1, a left exit pupil center point Ol2 and a right exit pupil center point Or2 of a binocular optical imaging module of an AR device, a left watching point Pl on a left imaging plane and a right watching point Pr on a right imaging plane of the binocular optical imaging module, a virtual imaging plane and an intersection point $p_w$ of lines of sight of both eyes on the virtual imaging plane. Infrared cameras of the AR device are used to capture images of human eyes, and ROI regions of pupils (regions including pupils) are extracted through feature detection. Pupils may be extracted according to a pupil localization algorithm, and centers of the left and right pupils may be determined through an ellipse fitting. Then, according to the sight watching model and the pupil center positions of both eyes, the position of the intersection point of the lines of sight of both eyes on the virtual imaging plane is calculated, and an implementation of calculating the position of the intersection point may include the following steps.

Step 1, coordinates of the center points of the left and right pupils are input into the sight watching model to calculate the coordinate of the left watching point Pl on the left imaging plane and the coordinate of the right watching point Pr on the right imaging plane of the binocular optical imaging module of the AR device.

Step 2, the coordinate of the intersection point of the left watching line Ll and the right watching line Lr on the virtual imaging plane is determined, wherein the left watching line Ll is determined according to the left exit pupil center point Ol2 and the left watching point Pl on the left imaging plane, and the right watching line Lr is determined according to the right exit pupil center point Or2 and the right watching point Pr on the right imaging plane. The left and right exit pupils of the binocular optical imaging module are already designed when hardware of the AR device is designed. Therefore, the left exit pupil center point Ol2 and the right exit pupil center point Or2 of the binocular optical imaging module in embodiments of the present disclosure are fixed parameters already known.

As shown in FIG. 3, the left pupil center point Ol1, the left exit pupil center point Ol2 and the left watching point Pl on the left imaging plane are connected to form a straight line, i.e., the left watching line Ll; and the right pupil center point Or1, the right exit pupil center point Or2 and the right watching point Pr on the right imaging plane are connected to form a straight line, i.e., the right watching line Lr. The left watching line Ll and the right watching line Lr have an intersection point $p_w$ on the virtual imaging plane, and the coordinate function of the intersection point may be expressed as:

$$p_w = (x_w, y_w, z_w).$$

After the coordinate of the intersection point is obtained, the watching range of human eyes may continue to be obtained, and an implementation for forming the watching range may include: determining a midpoint of a line connecting the left exit pupil center and the right exit pupil center of the binocular optical imaging module of the AR device, and constructing a sight cone by taking the line connecting the midpoint and the intersection point as a central axis and an angle φ as an apex angle, wherein the midpoint is the vertex of the sight cone, an initial value of the angle φ is between 15 degrees and 30 degrees (greater than or equal to 15 degrees and less than or equal to 30 degrees), and the inner space of the sight cone is the watching range.

Figure 4:
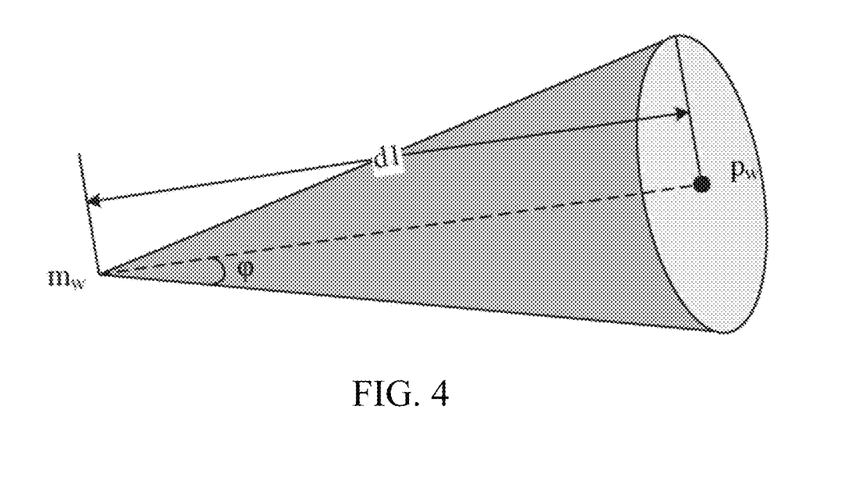
FIG. 4 is a schematic diagram of a sight cone according to the present disclosure.

FIG. 4 is a schematic diagram of a sight cone in the image processing method for the AR device provided in the present disclosure. Referring to FIG. 4, since the coordinates of the centers of the left and right pupils are known and the coordinate of the intersection point on the virtual imaging plane is known, and in addition, the center points (Ol2 and Or2) of the left and right exit pupils of the binocular optical imaging module are fixed parameters of the AR device and thus are also known, the midpoint of the line connecting the left exit pupil center point Ol2 and the right exit pupil center point Or2 is defined as the midpoint $m_w$, the $m_w$ and the $p_w$ are connected, the distance between the $m_w$ and the $p_w$ is d1, and the inner space of a sight cone constructed by taking the line connecting the $m_w$ and the $p_w$ as the central axis and an angle φ as the apex angle is the watching range of the human eyes.

Since a visual angle of human eyes is generally 120 degrees and is about 25 degrees when attention is concentrated, an initial value of the angle φ may be set within 30 degrees, for example, between 15 degrees and 30 degrees.

Figure 5:
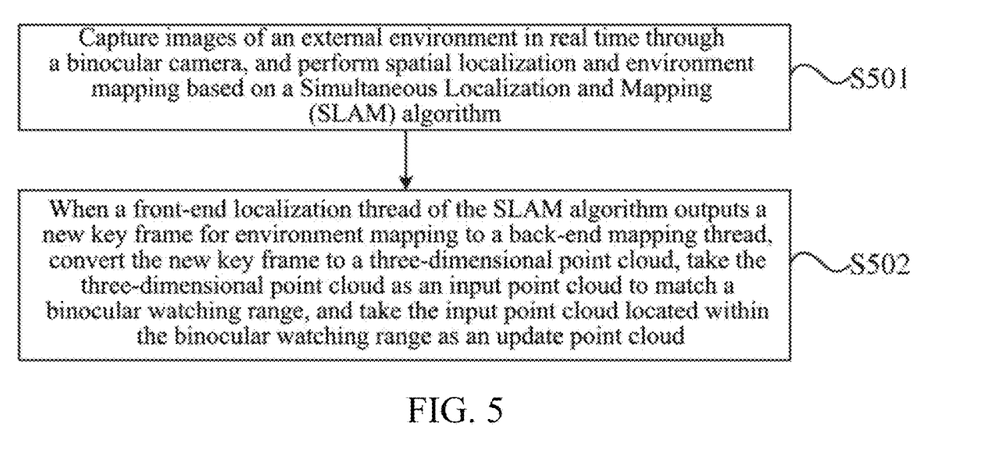
FIG. 5 is a flow chart of detecting an external environment update according to the present disclosure.

In an exemplary embodiment, as shown in FIG. 5, an implementation for detecting an update of an external environment may include the following steps S501-S502.

In S501, images of an external environment are captured in real time through a binocular camera, and spatial localization and environment mapping based on a Simultaneous Localization and Mapping (SLAM) algorithm is performed.

In S502: When a front-end localization thread of the SLAM algorithm outputs a new key frame for environment mapping to a back-end mapping thread, the new key frame is converted to a three-dimensional point cloud (3D point cloud C), the three-dimensional point cloud is taken as an input point cloud to match a binocular watching range, and the input point cloud located within the binocular watching range is taken as an update point cloud (3D point cloud C").

In an exemplary embodiment, the binocular watching range is a range of space within a sight cone. In S502, when a front-end localization thread of the SLAM algorithm outputs a new key frame for environment mapping to a back-end mapping thread, the new key frame is converted to a three-dimensional point cloud (3D point cloud C), the three-dimensional point cloud is taken as an input point cloud to match a sight cone, and the input point cloud located within the sight cone is taken as an update point cloud (3D point cloud C").

There are two situations after the end of the front-end localization thread of the SLAM algorithm. In the first situation, the front-end localization thread has a new key frame (i.e., an updated image) input to the back-end mapping thread, and the new key frame is converted to a 3D point cloud C. For a point $q_w$ in the point cloud C, the point $q_w$ and the $m_w$ are connected, and an angle β between $m_w q_w$ and $m_w p_w$ is calculated. When the angle β is smaller than the angle φ of the sight cone, the point $q_w$ can be regarded as falling within the sight cone. The point cloud that falls within the sight cone among the point cloud C is selected as the update point cloud, and the update point cloud is a subset of the 3D point cloud C. In the second situation, the front-end localization thread has no new key frame (i.e. updated image) input to the back-end mapping thread, and no operation is needed.

Figure 6:
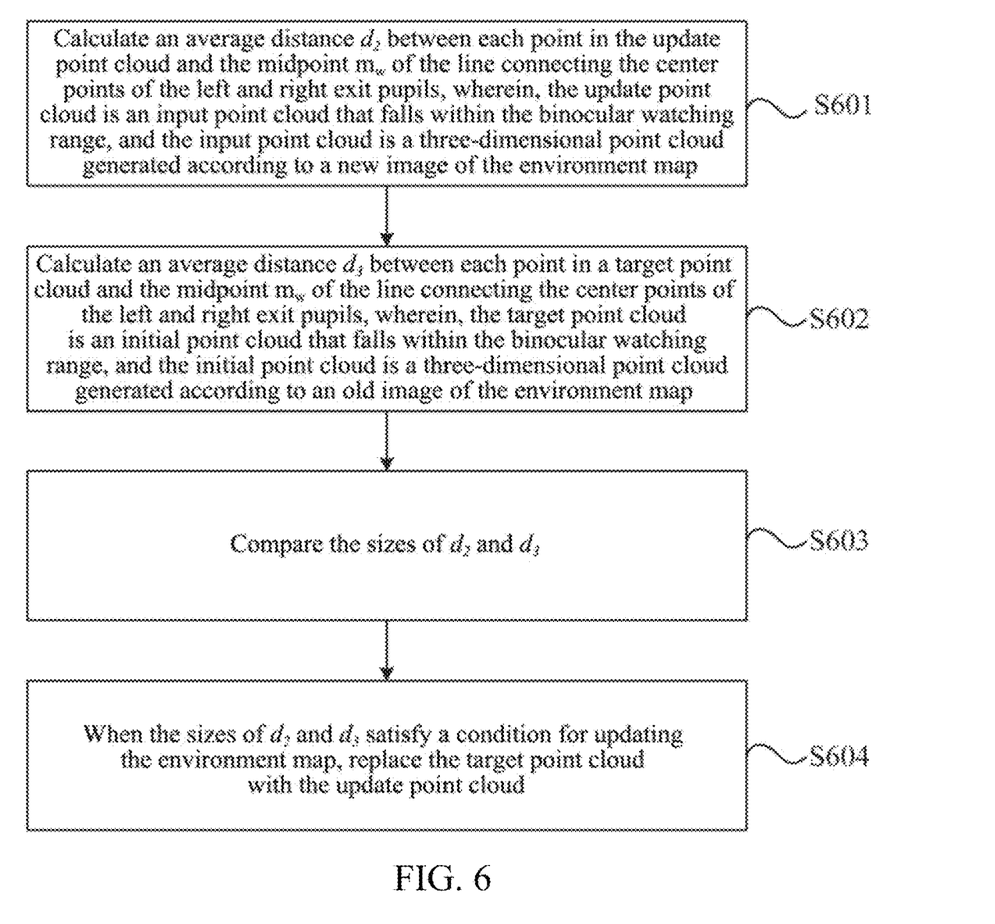
FIG. 6 is a flowchart of an implementation for updating environment map point cloud data within a binocular watching range according to the present disclosure.

In an exemplary embodiment, an implementation for updating the environment map point cloud data within the binocular watching range is as shown in FIG. 6, and may include the following steps S601-S604.

In S601, an average distance $d_2$ between each point in the update point cloud and the midpoint $m_w$ of the line connecting the center points of the left and right exit pupils is calculated; wherein, the update point cloud is an input point cloud that falls within the binocular watching range, and the input point cloud is a three-dimensional point cloud generated according to a new image of the environment map.

In S602, an average distance $d_3$ between each point in a target point cloud and the midpoint $m_w$ of the line connecting the center points of the left and right exit pupils is calculated; wherein, the target point cloud is an initial point cloud that falls within the binocular watching range, and the initial point cloud is a three-dimensional point cloud generated according to an old image of the environment map.

In S603, the sizes of $d_2$ and $d_3$ are compared.

In S604, when the sizes of $d_2$ and $d_3$ satisfy a condition for updating the environment map, the target point cloud is replaced by the update point cloud.

In an exemplary embodiment, the binocular watching range is a range of space within a sight cone.

According to the image processing method for the AR device provided by an embodiment of the present disclosure, the initial point cloud is a three-dimensional point cloud generated from an old image of the environment map obtained through the SLAM algorithm, and the target point cloud is a point cloud within the watching range among the initial point cloud, that is, the target point cloud is a subset of the initial point cloud. In addition, after the front-end localization thread of the SLAM algorithm ends, there are two situations. In one situation, the front-end localization thread does not output a key frame needed by the back-end mapping thread, and no operation is needed, that is, there is no afterimage phenomenon, so there is no updated image or update point cloud. In the other situation, the front-end localization thread has a new key frame (i.e., an updated image) input to the back-end mapping thread, then the new key frame is converted to the input point cloud C, and the point cloud within the watching range among the input point cloud is the update point cloud C".

According to the image processing method for the AR device provided by an embodiment of the present disclosure, under the parallel operation of the eyeball tracking algorithm and the SLAM algorithm, the initial point cloud, the input point cloud C, the watching range, the update point cloud C"

and the target point cloud are all concepts and ranges of 3D space, wherein the update point cloud C" and the target point cloud are point cloud data within the watching range among their original data (the original data of the update point cloud C" is the input point cloud C obtained according to the updated image, and the original data of the target point cloud is the initial point cloud). Therefore, the update point cloud is compared with the target point cloud, that is, the old image within the watching range (i.e., the target point cloud) is compared with the new image within the watching range (i.e., the update point cloud).

In an embodiment of the present disclosure, the two groups of point clouds (i.e., the update point cloud C" and the target point cloud) are compared. The distance $\{d_{in}\}$ between each point in the update point cloud C" and the $m_w$ is calculated, and the average $d_2$ of these distances ($\{d_{in}\}$) is calculated, the distance $\{d_t\}$ between each point in the target point cloud and the $m_w$ is calculated, and the average $d_3$ of these distances ($\{d_t\}$) is calculated. The update point cloud C" represents the new image output by the front-end thread of the SLAM algorithm, and the target point cloud represents the old image of the environment map.

In an exemplary embodiment, the condition for updating the environment map includes: the product of $d_2$ and s is greater than $d_3$ (i.e., $d_3 < d_2 \cdot s$); wherein s is a coefficient less than 1.

In the embodiment of the present disclosure, for the angle $\varphi$ of the constructed sight cone, only the sight range under a condition that a watching direction of the user is fixed is considered, and the case of $d_3 = d_2$ is not considered. In the case of $d_3 = d_2$, it may be determined that the user is circling around, so the value of the angle $\varphi$ is large. The case that $d_3$ is greater than $d_2$ (i.e., the afterimage is behind and the updated image is in front) has less effect on the watching of the user than the case that $d_3$ is less than $d_2$ (i.e., the afterimage is in front and the updated image is behind). Therefore, in an implementation of the embodiment of the present disclosure, the afterimage in the case of $d_3 < d_2 \cdot s$ is removed, and the way to remove the afterimage may be to replace the target point cloud with the update point cloud. A point cloud determined as containing an afterimage of a moving object (i.e., the target point cloud) is removed from the environment map (i.e., the initial point cloud), thereby the afterimage in the environment map is removed, and the removed target point cloud is replaced by the updated image (i.e., the update point cloud).

In an exemplary embodiment, in order to avoid an afterimage in a point cloud of a larger range than the target point cloud in the environment map, the image processing method may further include the following step S30 after step S20.

S30, the sight cone is updated, old and new data of the environment map point cloud space within the binocular watching range is compared again, and the environment map point cloud data within the binocular watching range is updated when the comparison result satisfy the condition for updating the environment map.

In an embodiment of the present disclosure, after the afterimage in the initial point cloud is removed, the range of the sight cone may be enlarged. For example, the angle $\varphi$ is sequentially increased to n times of the initial value, and the values of n may be discrete values greater than 1 and less than or equal to 4. It is already described in an above embodiment that the visual angle of human eyes is generally 120 degrees, and the maximum value of the initial value of the angle $\varphi$ is generally 30 degrees, so the maximum value of n may be 4.

After the value of the angle $\varphi$ is changed, an update point cloud and a target point cloud may be compared again according to the updated sight cone, and the steps S601-S604 may be repeatedly performed, so that an afterimage in an initial point cloud in a larger sight range may be removed.

It is already described in an above embodiment that after eye images are shot and coordinates of centers of the left and right pupils of the human eyes are calculated by the eyeball tracking technology, the coordinates may be input into the sight watching model for subsequent calculation. Therefore, the image processing method may further include a calibration process of the sight watching model before the use of the sight watching model.

Figure 7:
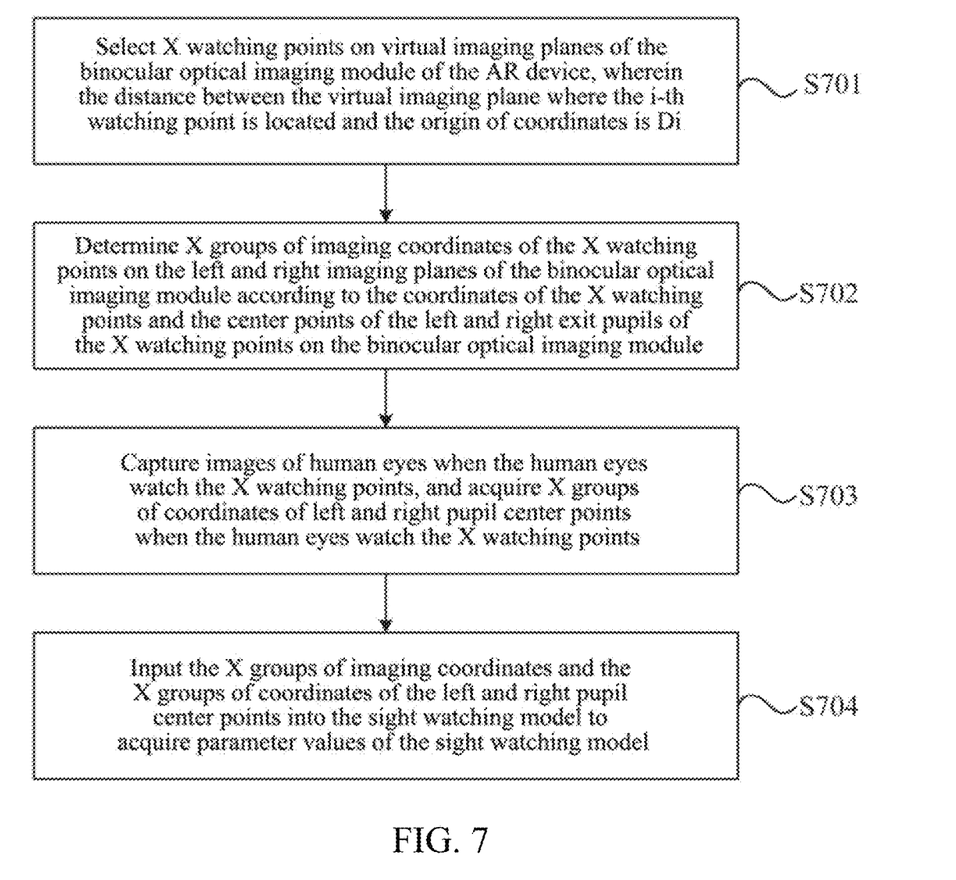
FIG. 7 is a flowchart of calibrating a sight watching model in an image processing method for an AR device according to the present disclosure.

In an exemplary embodiment, as shown in FIG. 7, a flow of calibrating a sight watching model may include the following steps S701-S704.

In S701, X watching points on virtual imaging planes of the binocular optical imaging module of the AR device are selected, and a distance between the virtual imaging plane where an i-th watching point is located and an origin of coordinates of the coordinate system is Di, wherein i is a positive integer greater than or equal to 1 and less than or equal to X.

In S702, according to the coordinates of the X watching points and the center points of the left and right exit pupils of the X watching points on the binocular optical imaging module, X groups of imaging coordinates of the X watching points on the left and right imaging planes of the binocular optical imaging module are determined.

In S703, images of human eyes are captured when the human eyes watch the X watching points, and X groups of coordinates of left and right pupil center points are captured when the human eyes watch the X watching points.

In S704, the X groups of imaging coordinates and the X groups of coordinates of the center points of the left and right pupils are input into the sight watching model to obtain parameter values of the sight watching model.

According to the image processing method for the AR device provided by an embodiment of the disclosure, the sight watching model may firstly be calibrated for a user when the user uses the AR device for the first time.

Referring to the imaging principle shown in FIG. 3, X watching points on virtual imaging planes at any distance d from the origin of coordinates are selected, for example, 9 watching points may be selected. The virtual imaging planes where the X watching points are located and the distances d may be the same or different, and Di is the distance between the virtual imaging plane where the i-th watching point is located and the origin of coordinates. As can be seen from FIG. 3, the left exit pupil center point Ol2 (or the right exit pupil center point Or2), the left watching point Pl on the left imaging plane (or the right watching point Pr on the right imaging plane), and the watching point on the virtual imaging plane (i.e., the intersection point $p_w$) of the binocular optical imaging module are on a same straight line. Therefore, according to the center points of the left and right exit pupils and the X watching points on the virtual imaging plane, it can be uniquely determined that X groups of left and right watching points on the left and right imaging planes of the binocular optical imaging module respectively correspond to the X watching points on the virtual imaging plane, and the coordinates of the X groups of left and right watching points on the left and right imaging planes of the binocular optical imaging module (i.e., the X groups of imaging coordinates on the binocular optical imaging module) may be expressed as: the coordinate of the left watching point Pl on the left imaging plane is: $(g_x^{(l)}, g_y^{(l)})$, and the coordinate of the right watching point Pr on the right imaging plane is: $(g_x^{(r)}, g_y^{(r)})$.

In addition, images of human eyes are captured by infrared cameras, the ROI regions of the pupils (regions containing pupils) are extracted through feature detection, pupils are extracted according to a pupil localization algorithm, and coordinates of center points of left and right pupils are determined through ellipse fitting: the coordinate of the left pupil center point Ol1: $(x_l, y_l)$; and the coordinate of the right pupil center point Or1: $(x_r, y_r)$.

The coordinate of the left pupil center point Ol1 $(x_l, y_l)$ and the coordinate of the left watching point Pl $(g_x^{(l)}, g_y^{(l)})$, and the coordinate of the right pupil center point Or1 $(x_r, y_r)$ and the coordinate of the right watching point Pr $(g_x^{(r)}, g_y^{(r)})$ are respectively input into the following formula (1):

$$\begin{cases} g_x = a_0 + a_1 x + a_2 y + a_3 xy + a_4 x^2 + a_5 y^2 \\ g_y = b_0 + b_1 x + b_2 y + b_3 xy + b_4 x^2 + b_5 y^2 \end{cases} \quad (1)$$

That is, the coordinate of the left pupil center point Ol1 $(x_l, y_l)$ and the coordinate of the left watching point Pl $(g_x^{(l)}, g_y^{(l)})$ are input into the following formula (2):

$$\begin{cases} g_x^{(l)} = a_0 + a_1 x_l + a_2 y_l + a_3 x_l y_l + a_4 x_l^2 + a_5 y_l^2 \\ g_y^{(l)} = b_0 + b_1 x_l + b_2 y_l + b_3 x_l y_l + b_4 x_l^2 + b_5 y_l^2 \end{cases} \quad (2)$$

The coordinate of the right pupil center point Or1 $(x_r, y_r)$ and the coordinate of the right watching point Pr $(g_x^{(r)}, g_y^{(r)})$ are input into the following formula (3):

$$\begin{cases} g_x^{(r)} = a_0 + a_1 x_r + a_2 y_r + a_3 x_r y_r + a_4 x_r^2 + a_5 y_r^2 \\ g_y^{(r)} = b_0 + b_1 x_r + b_2 y_r + b_3 x_r y_r + b_4 x_r^2 + b_5 y_r^2 \end{cases} \quad (3)$$

The above formula (1) is the sight watching model in the embodiment of the present disclosure. After inputting the X groups of imaging coordinates and the X groups of coordinates of the center points of the left and right pupils into the formula (1) for calculation, the sight watching models corresponding to the left and right eyes respectively can be obtained:

Left eye sight watching model: $f(x_l, y_l | a_{li}, b_{li})$;
Right eye sight watching model: $f(x_r, y_r | a_{ri}, b_{ri})$.

The parameters to be solved in the formula (1) include a0 to a5 and b0 to b5. Therefore, for the polynomial mapping model of formula (1), at least 6 groups of imaging coordinates and 6 groups of coordinates of the center points of the left and right pupils are required, that is, at least 6 watching points need to be selected. When the quantity of parameters in formula (1) is changed, in order to solve the specific values of the parameters, an appropriate quantity of watching points may be selected, for example, 9 watching points may be selected. The quantity of watching points may be selected based on a principle that all parameters of the sight watching model can be solved through the formula (1).

In a way of calibrating the sight watching model provided by an embodiment of the present disclosure, calibrations for the left eye and the right eye are performed simultaneously, that is, the finally obtained sight watching model includes the left eye sight watching model and the right eye sight watching model, and the coordinates on the imaging planes of the binocular optical imaging module (i.e., the imaging coordinates on the left and right imaging planes of the binocular optical imaging module) are calculated by using the watching points on the virtual imaging planes. In addition, the calibration process only needs to be performed once for each user.

The image processing method for the AR device provided by the embodiment of the present disclosure is an environment map interaction method based on an eyeball tracking technology. In the embodiment of the present disclosure, infrared cameras arranged inside the AR device are used to shoot images of eyes of a user, eye movement and pupil positions are detected and tracked in real time, and coordinates of a watching range of the eyes in a three-dimensional space are calculated according to a binocular parallax principle. A binocular camera which is arranged on an outer side of the AR device and in a same direction as the watching direction of the human eyes is used to shoot the external environment, to implement spatial localization and environment mapping of the SLAM algorithm. The eyeball tracking algorithm has lighter computation than the SLAM algorithm. By calculating the watching point of the human eyes, the location of the point cloud space (i.e., target point cloud) watched by the user in the environment map may be determined more quickly, and the point cloud data (i.e., target point cloud) around the watching point of the human eyes may be effectively updated. The method provided by the embodiment of the present disclosure may effectively avoid the fixation of the environment map when the SLAM technology is used to carry out mapping in the AR device, and the defect that a dynamic moving object and occlusion caused by the dynamic moving object cannot be effectively eliminated, and does not need to perform complex calculation processing while eliminating the effect of an afterimage of a moving object on the environment map, thus realizing lightweight calculation.

An embodiment of the present disclosure also provides an AR device, which is a device for executing the image processing method provided in the above embodiment.

Figure 8:
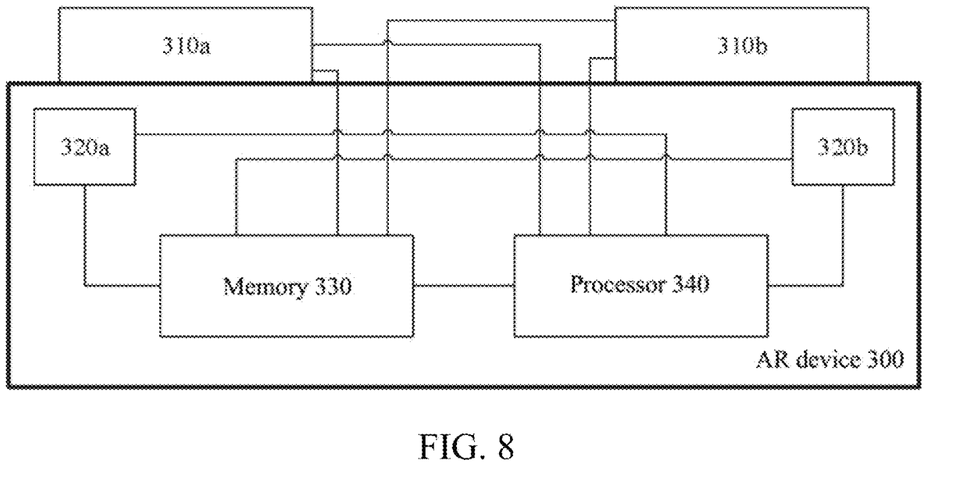
FIG. 8 is a schematic structural diagram of an AR device according to the present disclosure.

As shown in FIG. 8, the AR device 300 provided by an embodiment of the present disclosure may include an environment image capturing camera module 310, a human eye image capturing camera module 320, a memory 330, and a processor 340.

The environment image capturing camera module 310 is configured to capture an environment image.

The human eye image capturing camera module 320 is configured to capture human eye images.

The memory 330 is configured to store executable instructions.

The processor 340 is configured to implement the steps of the image processing method for the AR device when executing the executable instructions stored in the memory.

In an embodiment of the present disclosure, the environment image capturing camera module 310 may be a binocular camera module (such as the left camera module 310*a* and the right camera module 310*b* in FIG. 8), the binocular camera module may be arranged on an outer side of the AR device 300, and in the same direction as a watching direction of the human eyes, and is used for shooting an external environment. The shot external environment image is used for spatial localization and construction of an environment map by the SLAM algorithm. The AR device forms a 3D image based on the parallax of the left and right eyes. According to the parallax principle, when the left and right eyes of a user wearing the AR device respectively watch the images on the left and right imaging planes of the binocular optical imaging module of the AR device, because of the intersection of the lines of sight, it is equivalent to projecting a virtual object to a virtual imaging plane far away from the human eyes to form a stereoscopic effect, and the distance between the image on the virtual imaging plane and the human eyes is adjusted by controlling the parallax on the left and right imaging planes. The human eye image capturing camera module 320 may be two infrared cameras (such as 320a and 320b in FIG. 8) disposed inside the AR device 300, wherein the left infrared camera 320a is used to capture the image of the left eye of the user and the right infrared camera 320b is used to capture the image of the right eye of the user. The AR device 300 shown in FIG. 8 schematically shows a left camera module 310a and a right camera module 310b disposed on an outer side of the device, a left infrared camera 320a and a right infrared camera 320b disposed inside the device, and a memory 330 and a processor 340 disposed inside the AR device 300. FIG. 8 only schematically shows the positions of the environment image capturing camera module 310, the human eye image capturing camera module 320, the memory 330 and the processor 340, and modules and components in the AR device 300 are not limited to the positions and sizes of the modules and components shown in FIG. 8. Operations performed by the processor 340 in the embodiment of the present disclosure have been described in detail in the above embodiment of the image processing method for the AR device, and thus are not repeated here.

An embodiment of the present disclosure also provides a computer readable storage medium which stores executable instructions, and when the executable instructions are executed by a processor, the steps of the image processing method for the AR device are implemented.

Those of ordinary skill in the art will understand that all or some of the steps, systems, and functional modules/units in the methods disclosed above may be implemented as software, firmware, hardware, and appropriate combinations thereof. In hardware implementations, the division between functional modules/units mentioned in the above description does not necessarily correspond to the division of physical components. For example, a physical component may have multiple functions, or a function or step may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on computer readable media, which may include computer storage media (or non-transitory media) and communication media (or transitory media). As is well known to those of ordinary skill in the art, the term computer storage media includes volatile and nonvolatile, removable and non-removable media implemented in any method or technology for storing information such as computer readable instructions, data structures, program modules or other data. Computer storage media include, but are not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage devices, or any other media that can be used to store desired information and can be accessed by a computer. Furthermore, it is well known to those of ordinary skill in the art that communication media typically contain computer readable instructions, data structures, program modules, or other data in a modulated data signal such as a carrier wave or other transmission mechanism, and may include any information delivery medium.

Although embodiments of the present disclosure are described in the above, the contents are only embodiments for facilitating understanding the present disclosure rather than limiting the present disclosure. Any person skilled in the art to which the present disclosure pertains can make any modifications and variations in the forms and details of the implementations without departing from the spirit and the scope disclosed in the present disclosure, but the patent protection scope of the present disclosure shall still be subject to the scope defined by the appended claims.

What we claim is:

1. An image processing method for an augmented reality device, comprising:
    tracking lines of sight of a left eye and a right eye to determine a position of a binocular watching range in a three-dimensional space;
    shooting an image of an external environment where the augmented reality (AR) device is located, and acquiring environment map point cloud data based on a Simultaneous Localization and Mapping (SLAM) algorithm; and
    updating the environment map point cloud data within the binocular watching range in response to detecting an update of the image the external environment;
    wherein the tracking the lines of sight of the left eye and the right eye to determine the position of the binocular watching range in the three-dimensional space comprises:
    capturing an image of a left eye and an image of a right eye, determining a center position of a left pupil according to the image of the left eye, and determining a center position of a right pupil according to the image of the right eye;
    inputting pupil center position data of both eyes into a sight watching model to determine a position of an intersection point of the lines of sight of both eyes on a virtual imaging plane; and
    determining a midpoint of a line connecting a left exit pupil center and a right exit pupil center of a binocular optical imaging module of the AR device, constructing a sight cone by taking the line connecting the midpoint and the intersection point as a central axis, and taking a space within the sight cone as the binocular watching range; wherein a vertex of the sight cone is the midpoint.

2. The image processing method for the augmented reality device according to claim 1, wherein,
    the sight watching model is used to describe a mapping relationship between coordinates of the centers of the pupils of both eyes in a coordinate system and coordinates of watching points of the lines of sight of both eyes on left and right imaging planes of the binocular optical imaging module of the AR device in the coordinate system.

3. The image processing method for the augmented reality device according to claim 2, wherein,
    the inputting the pupil center position data of both eyes into the sight watching model to determine the position of the intersection point of the lines of sight of both eyes on the virtual imaging plane comprises:
    inputting the pupil center position data of both eyes into the sight watching model, and calculating a coordinate of a left watching point on a left imaging plane and a coordinate of a right watching point on a right imaging plane of the binocular optical imaging module of the AR device; and determining a coordinate of the intersection point of a left watching line and a right watching line on the virtual imaging plane; wherein the left watching line is determined by the left exit pupil center point and the left watching point on the left imaging plane, and the right watching line is determined by the right exit pupil center point and the right watching point on the right imaging plane.

4. The image processing method for the augmented reality device according to claim 2, wherein, the sight watching model comprises a polynomial model, and the polynomial model is expressed by a following formula:

$$\begin{cases} g_x = a_0 + a_1 x + a_2 y + a_3 xy + a_4 x^2 + a_5 y^2 \\ g_y = b_0 + b_1 x + b_2 y + b_3 xy + b_4 x^2 + b_5 y^2 \end{cases}$$

wherein $(g_x, g_y)$ is the coordinate of a watching point on an imaging plane of the binocular optical imaging module of the AR device, (x,y) is the coordinate of an eye pupil center, and $a_0, a_1, a_2, a_3, a_4, a_5, b_0, b_1, b_2, b_3, b_4, b_5$ are parameters of the model.

5. The image processing method for the augmented reality device according to claim 2, wherein, before tracking the lines of sight of the left and right eyes, the method further comprises:

selecting X watching points on virtual imaging planes of the binocular optical imaging module of the AR device, wherein a distance between a virtual imaging plane where an i-th watching point is located and an origin of coordinates in the coordinate system is Di, wherein i is a positive integer greater than or equal to 1 and less than or equal to X;

determining X groups of imaging coordinates of the X watching points on the left and right imaging planes of the binocular optical imaging module according to the coordinates of the X watching points and the left and right exit pupil center points of the X watching points on the binocular optical imaging module;

capturing human eye images when human eyes watch the X watching points, and acquiring X groups of coordinates of left and right pupil center points when human eyes watch the X watching points; and inputting the X groups of imaging coordinates and the X groups of coordinates of left and right pupil center points into the sight watching model to acquire parameter values of the sight watching model.

6. The image processing method for the augmented reality device according to claim 1, wherein, an initial value of an apex angle φ of the sight cone is greater than or equal to 15 degrees and less than or equal to 30 degrees.

7. The image processing method for the augmented reality device according to claim 1, wherein, the detecting an update of the image of the external environment comprises:

capturing the image of the external environment through a binocular camera in real time, performing spatial localization and environment mapping based on the SLAM algorithm; and when a front-end localization thread of the SLAM algorithm outputs a new key frame for environment mapping to a back-end mapping thread, converting the new key frame into a three-dimensional point cloud, taking the three-dimensional point cloud as an input point cloud to match the binocular watching range, and taking the input point cloud located within the binocular watching range as an update point cloud.

8. The image processing method for the augmented reality device according to claim 1, wherein, the updating the environment map point cloud data within the binocular watching range comprises:

calculating an average distance $d_2$ between the midpoint of the line connecting the center points of the left and right exit pupils and each point in an update point cloud;

calculating an average distance $d_3$ between the midpoint of the line connecting the center points of the left and right exit pupils and each point in a target point cloud; wherein, the target point cloud is an initial point cloud falling within the binocular watching range, and the initial point cloud is a three-dimensional point cloud generated according to an old image of an environment map; and comparing the sizes of $d_2$ and $d_3$, and when the sizes of $d_2$ and $d_3$ satisfy a condition for updating the environment map, replacing the target point cloud with the update point cloud.

9. The image processing method for the augmented reality device according to claim 8, wherein, the condition for updating the environment map comprises: $d_3 < d_2 \cdot s$, wherein s is a coefficient less than 1.

10. The image processing method for the augmented reality device according to claim 8, wherein, after replacing the target point cloud with the update point cloud, the method further comprises:

updating the sight cone; and recalculating the average distance $d_2$ between the midpoint of the line connecting the center points of the left and right exit pupils and the update point cloud and the average distance $d_3$ between the midpoint of the line connecting the center points of the left and right exit pupils and the target point cloud; comparing the sizes of $d_2$ and $d_3$, and when the sizes of $d_2$ and $d_3$ satisfy the condition for updating the environment map, replacing the target point cloud with the update point cloud.

11. The image processing method for the augmented reality device according to claim 10, wherein, the updating the sight cone comprises: setting an apex angle φ of the sight cone to be n times of an initial value, wherein n is greater than 1 and less than or equal to 4.

12. An augmented reality device, comprising:

an environment image capturing camera module, configured to capture an environment image;

a human eye image capturing camera module, configured to capture a human eye image;

a memory configured to store executable instructions; and a processor, configured to implement following steps when executing the executable instructions stored in the memory:

tracking lines of sight of a left eye and a right eye to determine a position of a binocular watching range in a three-dimensional space;

acquiring an image of an external environment where the augmented reality (AR) device is located, and acquiring environment map point cloud data based on a Simultaneous Localization and Mapping (SLAM) algorithm; and updating the environment map point cloud data within the binocular watching range in response to detecting an update of the image of the external environment;

wherein the tracking the lines of sight of the left eye and the right eye to determine the position of the binocular watching range in the three-dimensional space comprises:

capturing an image of a left eye and an image of a right eye, determining a center position of a left pupil according to the image of the left eye, and determining a center position of a right pupil according to the image of the right eye;

inputting pupil center position data of both eyes into a sight watching model to determine a position of an intersection point of the lines of sight of both eyes on a virtual imaging plane; and determining a midpoint of a line connecting a left exit pupil center and a right exit pupil center of a binocular optical imaging module of the AR device, constructing a sight cone by taking the line connecting the midpoint and the intersection point as a central axis, and taking a space within the sight cone as the binocular watching range; wherein a vertex of the sight cone is the midpoint;

wherein the sight watching model is used to describe a mapping relationship between coordinates of the centers of the pupils of both eyes in a coordinate system and coordinates of watching points of the lines of sight of both eyes on left and right imaging planes of the binocular optical imaging module of the AR device in the coordinate system.

13. The augmented reality device according to claim 12, wherein, the inputting the pupil center position data of both eyes into the sight watching model to determine the position of the intersection point of the lines of sight of both eyes on the virtual imaging plane comprises:

inputting the pupil center position data of both eyes into the sight watching model, and calculating a coordinate of a left watching point on a left imaging plane and a coordinate of a right watching point on a right imaging plane of the binocular optical imaging module of the AR device; and determining a coordinate of the intersection point of a left watching line and a right watching line on the virtual imaging plane; wherein the left watching line is determined by the left exit pupil center point and the left watching point on the left imaging plane, and the right watching line is determined by the right exit pupil center point and the right watching point on the right imaging plane.

14. The augmented reality device according to claim 13, wherein, the processor is configured to further implement following steps when executing the executable instructions stored in the memory:

selecting X watching points on virtual imaging plane of the binocular optical imaging module of the AR device, wherein a distance between a virtual imaging plane where an i-th watching point is located and an origin of coordinates in the coordinate system is Di, wherein i is a positive integer greater than or equal to 1 and less than or equal to X;

determining X groups of imaging coordinates of the X watching points on the left and right imaging planes of the binocular optical imaging module according to the coordinates of the X watching points and the left and right exit pupil center points of the X watching points on the binocular optical imaging module;

capturing human eye images when human eyes watch the X watching points, and acquiring X groups of coordinates of left and right pupil center points when human eyes watch the X watching points; and inputting the X groups of imaging coordinates and the X groups of coordinates of left and right pupil center points into the sight watching model to acquire parameter values of the sight watching model.

15. The augmented reality device according to claim 12, wherein, the detecting an update of the image of the external environment comprises:

capturing the image of the external environment through a binocular camera in real time, performing spatial localization and environment mapping based on the SLAM algorithm; and when a front-end localization thread of the SLAM algorithm outputs a new key frame for environment mapping to a back-end mapping thread, converting the new key frame into a three-dimensional point cloud, taking the three-dimensional point cloud as an input point cloud to match the binocular watching range, and taking the input point cloud located within the binocular watching range as an update point cloud.

16. The augmented reality device according to claim 12, wherein, the updating of the environment map point cloud data within the binocular watching range comprises:

calculating an average distance $d_2$ between the midpoint of the line connecting the center points of the left and right exit pupils and each point in an update point cloud;

calculating an average distance $d_3$ between the midpoint of the line connecting the center points of the left and right exit pupils and each point in a target point cloud; wherein, the target point cloud is an initial point cloud falling within the binocular watching range, and the initial point cloud is a three-dimensional point cloud generated according to an old image of an environment map; and comparing the sizes of $d_2$ and $d_3$, and when the sizes of $d_2$ and $d_3$ satisfy a condition for updating the environment map, replacing the target point cloud with the update point cloud.

17. The augmented reality device according to claim 16, wherein, the condition for updating the environment map comprises: $d_3<d_2 \cdot s$, wherein s is a coefficient less than 1.

18. A non-transitory computer readable storage medium storing executable instructions, wherein when the executable instructions are executed by a processor, the following steps are implemented:

tracking lines of sight of a left eye and a right eye to determine a position of a binocular watching range in a three-dimensional space;

acquiring an image of an external environment where the augmented reality (AR) device is located, and acquiring environment map point cloud data based on a Simultaneous Localization and Mapping (SLAM) algorithm; and updating the environment map point cloud data within the binocular watching range in response to detecting an update of the image of the external environment;

wherein the tracking the lines of sight of the left eye and the right eye to determine the position of the binocular watching range in the three-dimensional space comprises:

capturing an image of a left eye and an image of a right eye, determining a center position of a left pupil according to the image of the left eye, and determining a center position of a right pupil according to the image of the right eye;

inputting pupil center position data of both eyes into a sight watching model to determine a position of an intersection point of the lines of sight of both eyes on a virtual imaging plane; and determining a midpoint of a line connecting a left exit pupil center and a right exit pupil center of a binocular optical imaging module of the AR device, constructing a sight cone by taking the line connecting the midpoint and the intersection point as a central axis, and taking a space within the sight cone as the binocular watching range; wherein a vertex of the sight cone is the midpoint.

* * * * *